United States Patent [19]

Stringer

[11] 3,853,501
[45] Dec. 10, 1974

[54] REMOVAL OF RADIOACTIVE RADON DAUGHTERS FROM AIR

[75] Inventor: Carl W. Stringer, Sugarland, Tex.

[73] Assignee: Radon Development Corporation, Houston, Tex.

[22] Filed: July 16, 1973

[21] Appl. No.: 379,606

[52] U.S. Cl............................ 55/37, 34/15, 55/48, 55/56, 55/85, 55/89, 55/91, 55/98, 55/228, 55/232, 55/DIG. 9, 98/50, 210/282, 210/500, 261/5, 261/83, 299/12
[51] Int. Cl... B01d 19/00, B01d 27/00, B01d 47/00
[58] Field of Search............... 55/36, 37, 48, 56, 83, 55/84, 85, 89, 90, 91, 98, 220, 228, 229, 230, 231, 232, 233, 234, 242, 421, DIG. 9; 210/263, 269, 281, 282, 283, 287, 291, 500, 501, 502, 503, 504, 505, 506; 261/5, 83, 91, 92, 94, 95; 299/12; 98/1, 2, 2.11, 50; 34/12, 13, 15, 51, 60, 62, 92; 176/37, 87

[56] References Cited
UNITED STATES PATENTS

| | | | |
|---|---|---|---|
| 1,402,706 | 1/1922 | Auberschek | 210/282 X |
| 3,299,619 | 1/1967 | Terry | 55/85 |
| 3,318,075 | 5/1967 | Wilson | 55/DIG. 9 |
| 3,403,498 | 10/1968 | Pasha | 55/90 |
| 3,439,809 | 4/1969 | McPherren | 210/283 X |
| 3,482,377 | 12/1969 | Walrave | 55/255 |
| 3,488,960 | 1/1970 | Kirkpatrick | 261/17 X |
| 3,635,001 | 1/1972 | Brown | 55/228 X |

FOREIGN PATENTS OR APPLICATIONS 948,370   2/1964   Great Britain .............. 98/2

OTHER PUBLICATIONS

Nuclear Merchant Ship Reactor Final Safeguards Report, Environmental Analysis of NS "Savannah" Operation at Camden, USAEC Report ORNL, 2867 (Rev.), Oak Ridge National Laboratory, Jan. 24, 1961, pages 9–11.

Primary Examiner—Dennis E. Talbert, Jr.

[57] ABSTRACT

An improved process for controlling radioactive radon daughters in the air in a working environment in a mine or during ore processing is described. The described process involving a filter for water contaminated with radon daughters is used in conjunction with air cleaning systems which employ water as a trap for radon daughters. The filter medium involves use of granular substrate which has been dried and oil-wetted with a normally-liquid hydrocarbon material.

25 Claims, No Drawings

REMOVAL OF RADIOACTIVE RADON DAUGHTERS FROM AIR

BACKGROUND OF THE INVENTION

The field of this invention relates to the removal of radioactive radon daughter particles from working environments found in mines, especially uranium mines, and processing plants where radioactive ores are processed.

Proper ventilation and expulsion of dust from mines and ore processing plants has long been a problem requiring extensive and often expensive measures to be taken to transport a sufficient volume of fresh uncontaminated air into the working area of a mine to sweep out contaminated air containing dust and fumes. The same sort of problem exists in ore processing plants where it is necessary to remove dust and particles from the working environment. With the discovery of the importance of uranium, and hence its mining activities, another problem appeared to further complicate an already complex program of mine safety. That problem was the problem of radiation, particularly radiation brought about by radon gas and the so-called radon daughter products which are radioactive members in the decay series of uranium.

A radioactive member in a series is actually decaying as it is being formed. After a suitable length of time, members in the series gradually attain equilibrium—at equilibrium the members of the series are being produced by their parent at the same rate they are decaying. A radioactive decay series reaches equilibrium when all its members are in equilibrium. The amount (number of atoms) of each member present when the series achieves equilibrium is directly proportional to the member's half-life. The longer the half-life, the more atoms that are present.

Radon is a chemically inert gas which diffuses from rock surfaces into the mine atmosphere or is released when ore is crushed as during processing. When radon is formed it immediately begins decaying to radium A; radium A decays through radium B and radium C to radium C'. As far as the potential alpha radiation hazard is concerned, decay beyond radium C' to radium D is unimportant because of the relatively long half-life, 22 years, of radium D (lead$^{210}$). The daughter products of radon are atoms of solid substances whose half-lives are as follows: RaA (radium A), 3.05 minutes; RaB, 26.8 minutes; RaC, 19.7 minutes; and RaC', 0.0002 seconds. Radon, RaA, and RaC' are the members of this immediate series that emit alpha energy as they disintegrate. Although RaB and RaC are not alpha emitters, they decay rather quickly to RaC' which is a strong alpha emitter. The energy emissions of the daughters are shown on Table I.

For a given quantity of radon, the daughters achieve equilibrium in about 3 hours. Potential alpha energy reaches about 50 percent of maximum in about 40 minutes because of the build-up of RaA, RaB, and RaC. Because of its very short half-life, alpha activity from RaC' corresponds to the activity of RaC. RaB actually contributes the most alpha energy from an equilibrium mixture of daughters because there are more atoms present capable of decaying through RaC'.

Radon gas diffuses into the mine atmosphere after emanating from rock surfaces and can be inhaled as can radon gas released during ore processing; however, because it is a gas, radon is exhaled before it is able to emit appreciable amounts of alpha energy. Radon daughters formed in air can also be inhaled. Where there is inhalation of both radon and its daughters, it has been estimated that radon contributes only about 5 percent of the alpha radiation dosage received by the lungs. Later estimates of the alpha dose percentage from radon in normal mine atmospheres indicate a smaller percentage.

The daughter nuclides are small enough that their principal means of transport is by diffusion and turbulent mixing. Few unattached radon-daughter atoms are found in mine air because of their kinetic interaction with the natural aerosols present. When the mine air is breathed, a portion of the dust is trapped in the respiratory system where attached radon-daughters decay, and the soft lung tissue is irradiated by the alpha particles emitted.

The few daughters which are not attached to dust or other condensation nuclei when inhaled tend to be deposited and concentrated in the upper respiratory tract before reaching the lungs. Some investigators have suggested that this part of the overall alpha dose received by the respiratory system may be of special importance so far as the health hazard is concerned.

Alpha particles are identical with the nucleus of a helium atom, having two protons and two neutrons. Because of their relatively large mass, alpha particles readily collide with other atoms, giving up their energy with little penetration and high specific ionization.

Considerable evidence indicates that excessive exposure to radon daughter products is associated with a high incidence rate of lung cancer. In view of the foregoing, it is not surprising that there is considerable concern for the radon gas and radon daughter levels in the working environment in mines and ore processing plants. This concern has led to the establishment of allowable exposure levels and led to what has been called the working level (WL) which has been defined as that concentration of short-lived radon daughter products in a liter of air that will yield $1.3 \times 10^5$ million electron volts (mev) of alpha energy in decaying through RaC'. This definition has become the standard by which engineers and regulatory agencies operate. Defining WL in terms of total potential alpha energy rather than

TABLE I

Decay Properties of Rn$^{222}$ and Its Daughters

| Nuclide | Designation | Emissions | Half Life | Alpha Energy (meV) |
|---|---|---|---|---|
| Rn$^{222}$ | Rn | $\alpha$ | 3.82 Days | 5.48 |
| Po$^{218}$ | RaA | $\alpha$ | 3.05 Days | 6.00 |
| Pb$^{214}$ | RaB | $\beta, \gamma$ | 26.8 Minutes | — |
| Bi$^{214}$ | RaC | $\beta, \gamma$ | 19.7 Minutes | — |
| Po$^{214}$ | RaC' | $\alpha$ | $1.6 \times 10^{-4}$ Sec. | 7.68 |
| Pb$^{210}$ | RaD | $\beta, \gamma$ | 22.0 Years | — | picocuries per liter of air avoids the necessity of defining the equilibrium relationship between RaA, RaB, and RaC. A WL is the potential energy released by 100 picocuries each of RaA, RaB and RaC, but under this equilibrium condition, 300 picocuries of the daughters may not be equivalent to 1 WL. Regulatory agencies have set forth limitations of working level to which miners particularly can be exposed, such regulations being promulgated to the extent that if the atmospheric concentration of radon daughters exceeds 1 WL but is less than 2 WL immediate corrective action has to be taken or the workers be withdrawn from the environment contaminated with radon and radon daughters. When concentrations higher than 2 WL exist, the workers are withdrawn immediately until the radon daughter atmospheric concentrations are reduced to 1 WL or less. Even more strict regulations may be imposed. Further discussion of the alpha radiation problem in underground uranium mines is found in "Controlling Employee Exposure to Alpha Radiation in Underground Uranium Mines," R. L. Rock and D. K. Walker, Volume 1, Bureau of Mines, United States Department of the Interior, 1970.

As mentioned above, dust and natural aerosols provide considerable quantities of condensation nuclei for the attachment of the radon daughters and consequently increase the probability of their being inhaled into the respiratory system of the workers. The hazard from a given radon daughter concentration is also enhanced by higher percentages of free or unattached radon daughter ions as mentioned above. The control of such radioactive radon daughters is the subject of extensive investigation and considerable discussion of the problem is found in the previously referenced Bureau of Mines publication. Various methods have been attempted to remove the radon daughter products from the mine atmosphere, but have been met with somewhat disappointing results. The daughters being airborne particles can be trapped by filters or ionized by electronic air cleaners. Unfortunately, such filtration or electronic air cleaning often have the effect of increasing the percentage of free ions or unattached daughters to regrow in the cleansed air. This is the result of the moving a larger percentage of the aerosol particles or dust to which the charged daughter ions attach themselves.

It has been found that, when filters are either wetted or washed with water, the radon daughter products, either unattached as free ions, or those attached to aerosol particles can be captured in the wash water. However, unless large quantities of water are used, or the water used on a once-through basis, the radon daughters products in the water build up such that an equilibrium is effectively reached and the filter becomes ineffective to remove the radon daughter products and prevent their regrowth in the filtered air. Of course, it is often impractical, if not impossible, to employ the water wash on a once-through basis or to accumulate large quantities of water in the area of the filter in a close mine passage. Disposal of large quantities of contaminated water used to clean the air in ore processing plants also presents an ecological problem.

It is accordingly the object of this invention to clean up the water comtaminated with the radon daughter products removed from the air in mines and ore processing plants such that the working environment can be kept relatively free of the radon daughter alpha radiation.

SUMMARY OF THE INVENTION

This invention relates to an improvement in the method for removing radioactive radon daughter products from the working environment in underground mines and ore processing plants by inserting a filter medium into a water washed filter system and circulating the water in which the radon daughter products are trapped through the filter medium of this invention to remove said daughter products, thus cleaning the water for reuse to wet the air filter. The filter medium of this invention involves the use of dried water-insoluble granular substrate which has been wetted with a normally liquid hydrocarbon. The preparation of the filter medium is also an aspect of this invention and involves the heating, preferably under vacuum, of the granular substrate for a time sufficient to remove substantially all of the moisture which may be on the surface, and in the pores, of the substrate. The substrate material is then treated with a normally liquid hydrocarbon to wet the surface of said substrate with said hydrocarbon. The medium thus prepared, when placed in a suitable filter container, has been found to effectively remove the radon daughters from water such that the water can be recycled over an air filter to trap more radon daughter contaminants which are removed from the air by the water washed filter.

DESCRIPTION OF THE PREFERRED EMBODIMENTS

The improved process of this invention embodying the filter medium of this invention involves placing a filter container containing said filter medium in a water washed air filter system whereby water is used to wash the air filter and traps the radon daughter contaminants. This contaminated water is circulated through the filter of this invention where the radon daughters are removed from the water. The cleaned water is then returned to the air filter to collect more of the radon daughter contaminants.

A number of different types of air filters have been and can be used in the scrubbing of the radon daughters, dust and aerosols from mine air or removing such particles from the air in working areas in ore smelters. While the type of wetted filter used is not a critical feature of my invention, they are often of the same type as used in air-conditioning systems to move air and to humidify the same. Such filters involve a porous filter material, usually a fiber, for example, glass fibers, which is wetted while pulling air through the filter. The configuration of this filter is not important and can be a drum rotating through a pan of water for wetting, or a rotating drum filter subjected to water spray or, for example, filter material having water cascading down over it with air being continually drawn or pushed through a wetted filter and transported, generally in the case of in mine shafts, by flexible fabric tubing to a work area. Such arrangements are described in the previously referenced Bureau of Mines publication. The arrangement of the wetted air filter and air blowers and air conveyance means are well within the skill of the ordinary practitioner and often are integrated into a unitary piece of apparatus such as that used in air-conditioning and/or humidification systems. The elimination of the radon daughter radioactive contamination from the air, and consequently from the water, has heretofore been a problem, now solved by the practive of this invention.

The filter medium used in the practice of this invention is a granular substrate which has been dried of water and surface wetted with a normally liquid hydrocarbon of sufficient fluidity and sufficiently low viscosity to wet the surface and pores of the substrate. The granular substrates useful as the primary filter medium in the practice of my invention, for example, can be sand, bauxite, synthetic silica-alumina materials, such as cracking catalyst, ground glass, crushed quartz, precipitated silicates, and the like. Soft clays should be avoided since they would tend to disintegrate and cause a plugging of the filter medium. While sand is the preferred substrate because of its availability and stability, the practitioner in the art can select other suitable substrates.

The particle size of the granular substrate used in the practice of this invention should be fairly uniform and of sufficient size to avoid low permeability caused by channeling or packing as may occur in the case of soft clays mentioned above. The particle size should be as small as possible to provide maximum surface area for the amount of material used while avoiding particles that are too small to allow a uniform flow of the water through the filter. Most suitable for the practice of this invention are those substrate materials of such size that they are retained on a 90-mesh (Tyler) screen and preferably the size of the materials used would be uniform to allow a high permeability of the bed such that the water contaminated with the radon daughters would move through the filter in a uniform manner providing for the maximum contact and efficiency with a minimum of pressure drop across the filter. A range of particle sizes which would pass a 20-mesh screen and be retained on a 90-mesh screen is especially preferred. Another criterion important to the selection of the substrate is its inertness to change upon contact with water and also its susceptibility to being completely dried even to the extent of removing moisture from the pores of the substrate material. This water removal is important since it is necessary to wet substantially the entire surface of the substrate with the hydrocarbon to achieve optimum performance of the filter.

A filter medium containing the granular substrate without further treatement has little or no effect on the level of radon-daughter contamination in the water. Therefore, to successfully remove the contamination, further preparation is necessary. In the preparation of the filter medium to be used in the practice of this invention, the granular substrate is heated to remove any water from its surface and, insofar as possible, from its pores since any moisture remaining would prevent that portion of the substrate from being wetted with the liquid hydrocarbon. One of ordinary skill in the art would recognize the length of time and temperatures necessary to provide for such drying as dependent upon the substrate selected and the particle size of the material. It is preferable, of course, while heating the substrate, to place it in a container upon which a vacuum can be drawn to more efficiently remove the moisture from its surface and substantially all moisture trapped in the pores of the substrate. It has been found that it is satisfactory to heat the material for from about 4 to 12 hours at a temperature of from about 200°F to about 500°F under a vacuum drawn by, for example, a commercially available laboratory vacuum pump. Such pumps are available which will pull a vacuum of about 1 to 2 mm mercury.

Once the material has been dried to remove the moisture, the substrate is then treated with a normally liquid hydrocarbon. Generally, such a hydrocarbon will have a sufficiently low viscosity to wet the surface and preferably the pores of the substrate to form an oil-wetted substrate. Such materials useful in the practice of this invention are, for example, benzene, toluene, xylene, cyclohexane, hexane, heptane, and the like, and mixtures thereof. Other hydrocarbons include those hydrocarbon distillation fractions, such as kerosene, mineral oil, aromatic distillate, and the like which are normally liquids. By "normally liquid" as used herein is meant those hydrocarbon materials which are liquid at temperature and ambient conditions under which they are to be used in the process of the invention and also the conditions under which the dried substrate is contacted. From the foregoing, one of ordinary skill in the art can easily select the normally liquid hydrocarbon to wet the surface of the substrate by consulting any table showing the properties of organic substances such as that found in, for example, "Chemical Engineer's Handbook," John H. Perry, Ed., McGraw-Hill.

In wetting the surface of the substrate, it should be done in such a manner to minimize the chance that moisture could again become attached to the surface and/or pores of the substrate since, if moisture is present on the substrate, it will not become oil-wetted. Therefore, it is preferable in the preparation of the filter medium to be used in the practice of this invention, to perform such wetting step before the substrate has had a chance to cool to ambient temperatures from the heating to remove moisture. However, if high temperatures for the dehydration of the substrate have been used, it would be preferable to allow it to cool somewhat to avoid the possibility of boiling the liquid hydrocarbon being used to wet the surface. Most preferably, the wetting would be done by adding an excess of the liquid hydrocarbon to the substrate material while it is in the vacuum chamber from being dried of the moisture. The preferable liquid hydrocarbons to use are aromatic hydrocarbons, such as benzene, toluene, xylene, and the like, and most preferably a mixture of the aromatic hydrocarbon, such as benzene, and another liquid hydrocarbon, such as mineral oil, for example. When a mixture is used, it will preferably contain from about 80 percent to about 60 percent by volume of the aromatic hydrocarbon and correspondingly, from about 20 percent to about 40 percent of another liquid hydrocarbon, which may also be aromatic, if desired.

The normally liquid hydrocarbon should remain in contact with the dried substrate for a time sufficient to thoroughly wet its surface. Stirring is permissible to ensure the proper wetting. Generally, the wetting will take place in the length of time necessary for the heated substrate to cool to ambient temperature, generally from about 30 minutes to about an hour. Longer time can be taken but it is unnecessary.

After wetting the substrate surface, the excess liquid hydrocarbon would be decanted and the hydrocarbon-wetted substrate transferred to a container from which further excess liquid hydrocarbon can drain or be removed. While it is desired that the surface of the substrate be thoroughly wetted, it is not desirable to have such a quantity of the liquid hydrocarbon present that it becomes mixed with the water which is circulating through the system used for removing the radon daughters from the air. Further, if there appears to be an excess of liquid hydrocarbon remaining on the substrate particles after the material has been drained, this material can be removed by contacting the hydrocarbon-wetted substrate with oil-absorbant materials such as, for example, ordinary kitchen toweling. Once drained and freed of excess liquid hydrocarbon material, the hydrocarbon-wetted substrate is ready for use in the filter in the practice of this invention.

It is accordingly placed in a suitable filter body which can be of substantially any material since there is little likelihood of corrosion, and the pressure and temperature of operation are low. The type of filter body used for a swimming pool filter is satisfactory. Of course, the filter must have an inlet and outlet in order to allow the water from the wetting system to pass through the filter medium to remove the radon daughter products from the water. The filter body should have also a means whereby the filter medium could be removed and the filter body recharged with fresh filter medium. However, for small installations, the filter could be discarded when its effectiveness is diminished and replace it with a newly charged filter. One preferred filter body which can be used is polyvinyl chloride pipe flanged at either end to allow access. The ends are covered with flanges drilled and tapped for inlet and outlet of the water circulating through the filter. Of course, sizing of the filter depends upon the amount of water which is circulated therethrough and is well within the skill of the ordinary engineer in the art. It is preferred to orient the filter such that flow is vertical through the filter medium and preferably up.

In large installations such as ore processing plants and for the emergency quench water for nuclear power plants, a filter of the type used for water treatment plants can be used. In such an installation, the filter medium is usually a bed of sized gravel utilizing different sizes of granular material. The material can be prepared as described above for use in such a filter where the radon daughter contamination from large quantities of water must be removed.

The foregoing is especially applicable to ore treating plants where uranium ores are recovered. These plants are usually in remote locations and the ecology must be protected from the radon contamination in the water used to reduce the radiation level in the air in the working environment.

As an optional supplementary filter medium to the above-described primary filter medium, it is also within the scope of this invention to use as a substrate, certain oil-wettable plastic particles, such as cellulose acetate pellets or beads useful for plastic moldings, and pellets of polystyrene, polypropylene, polyethylene, and the like. These materials, when used, would be dried in much the same manner as the above-described substrate, but care must be taken to avoid using temperatures above the point where the pellets become soft or melt, so that the pellets would maintain their discrete and substantially uniform size distributions. Normally, the thermoplastic pellets would be dried under vacuum at only slightly elevated temperatures. It is within the scope of this invention to use this medium, described as the supplementary filter medium as the sole medium in certain applications.

In packing the filter body, when the pellets are used as a supplemental medium, the pellets generally would be placed on the bottom towards, preferably, the inlet side of the filter with the hydrocarbon-wetted granular substrate, above described, forming the top, or primary, filter medium. When hydrocarbon-wetted pellets are used as a supplemental filter medium, it would preferably make up about 25 percent to about 65 percent of the filter volume with the remaining volume being the liquid hydrocarbon-wetted granular substrate described above. Most preferably, from about 40 percent to about 60 percent of the filter volume would be the supplemental filter material. As stated above, however, the pellets could be used alone in some applications.

The above described invention will be further illustrated by the following example which is offered for purposes of illustration and instruction only and should not be considered to be limiting upon the scope and applicability of this invention.

EXAMPLE

Approximately 5 gallons of sand, having a size such that it passed an 80-mesh screen and was retained by a 90-mesh screen, was placed in a vacuum container equipped with an outlet line connected through a liquid trap to a Fische laboratory vacuum pump capable of pulling a vacuum of 1 to 2 mm mercury in the vacuum tank. The tank was further equipped with a valved inlet through which a liquid hydrocarbon could be drawn.

The vacuum container was placed over direct heat (a gas burner) and the sand dried for about 12 hours under a vacuum of 1 to 2 mm mercury at a temperature of about 400°F. After the drying period, the heat was turned off and a liquid hydrocarbon mixture containing three-fourths benzene and one-fourth mineral oil, by volume, was introduced into the vacuum container through the inlet line by suction from the vacuum pump until hydrocarbon appeared in the trap. The vacuum pump was then shut off and the sand and oil mixture was allowed to cool. The vacuum container was opened, the excess hydrocarbon decanted and the oil-wet sand poured on the screen to drain, where it remained for two days. To assure removal of excess oil from the surface of the sand, oil was absorbed from the sand on absorbant toweling. Thus, the hydrocarbon-wet substrate primary filter medium was prepared.

In order to supplement the above described oil-wet sand, commercially available cellulose acetate pellets of a size from ⅛-inch to 3/16-inch diameter were placed in the vacuum container and were dried without heating by pulling a vacuum with a vacuum pump for 4 to 5 hours. The benzene-mineral oil mixture was sucked into the vacuum chamber and the vacuum pump shut off. After allowing the pellets to sit in contact with the benzene-mineral oil mixture for about 30 minutes, the excess oil was decanted and the pellets dried as above to remove excess oil.

To construct the filter, a polyvinyl chloride pipe having a 5¾ inch inside diameter and 24¾ inches long, fitted with flanged connections providing for a flange on either end which was drilled and tapped to receive a ¾-inch pipe thread. The flange was attached to the bottom and the above-described pellets uniformly packed to a level 15 inches above the flange. A screen was placed on top of the pellets and the remaining 9 inches of the filter body filled with the hydrocarbon-wetted sand. The top flange was attached.

The filter thus described was kept in a vertical position with the sand primary filter medium on top and installed in an air cleaning system in a uranium mine having a high level of radon daughter contamination in the environment. The air system upon which the filter of this invention was installed comprised a 4-foot long by 4-foot diameter rotating fiber-packed drum through which air was drawn by a 1,500 CFM blower exhausting the filtered air through a 16-inch cylindrical fabric vent to an area in the mine. The rotary filter rotated through a pan of water at a rate of 10 rpm to wet the filter. The water pan was connected with a water outlet and a water inlet. The water outlet was connected to a pump circulating the water from the pan, through the filter and back to the pan at about 360 GPM such that contaminated water was removed from the pan after contacting the air filter and decontaminated water returned to the pan prior to its contact with the air filter. Prior to beginning of the test, the radon daughter contamination of the mine which had been shut down was 150 WL. After 90 minutes operation using the filter of this invention and circulating the water therethrough, the level of radon daughter contamination in this section of the mine was reduced to 0.5 WL, a satisfactory working level for operation of a mine. The filter was continuously operated for about seven months, maintaining the low acceptable working level in the mine without necessity of changing the medium. The method of determining the level of radon daughter products in mines is well-known to those skilled in the art and is discussed in "Controlling Employee Exposure to Alpha Radiation in Underground Uranium Mines," R. L. Rock, R. W. Dalzell, E. J. Harris, Volume 2, United States Department of the Interior, Bureau of Mines, 1971. This method of analysis or any other suitable method known to those skilled in the art is satisfactory.

When running discontinuously, the working level of radon daughter contamination in the mine was allowed to increase, but immediately upon reactivating the improved filter system of this invention, the working level was brought back down to acceptable levels.

The filter described in this example was taken out of the system and inspected and showed no detactable deterioration.

The above described filter can also be satisfactorily used in a system whereby the air in an ore processing plant is directed through a similar water washed filter by using a dust collection hood wherein the water wash is also circulated through the filter medium.

From the above described invention, those of ordinary skill in the art will be able to make many obvious modifications and applications of said invention which do not depart from the scope and spirit of the described and claimed invention.

I claim:

1. In the method for removing radioactive radon daughters from air which comprises filtering air contaminated with radon daughters through a water-wetted filter to capture the radon daughters in the water, the improvement which comprises:
   circulating the water contaminated with the captured radon daughters through filter medium comprising a water-insoluble granular substrate wherein the surface of the substrate has been dried of water and then wetted with a normally liquid hydrocarbon; and
   returning the filtered water to again wet the air filter and capture additional radon daughters.

2. The method of claim 1 wherein the water-insoluble substrate is sand having a particle size such that it passes a 20-mesh screen and is retained on a 90-mesh screen.

3. The method of claim 1 wherein the normally liquid hydrocarbon is an aromatic hydrocarbon.

4. The method of claim 3 wherein the aromatic hydrocarbon is blended with from about 20 percent to about 40 percent by volume mineral oil to form the normally-liquid hydrocarbon.

5. The method of claim 4 wherein the normally liquid hydrocarbon is about 20 percent to about 40 percent by volume mineral oil and, correspondingly, from about 80 percent to about 60 percent by volume benzene.

6. The method of claim 5 wherein the substrate is sand.

7. The method of claim 1 wherein the filter medium comprises a primary filter medium of the water-insoluble granular substrate and a supplementary filter medium consisting of oil-wettable plastic pellets which have been wetted with a normally liquid hydrocarbon.

8. The method of claim 7 wherein the granular substrate is sand and the plastic pellets are made of cellulose acetate.

9. The method of claim 8 wherein the normally liquid hydrocarbon is a mixture of about 80 percent to about 60 percent, by volume, an aromatic hydrocarbon and, correspondingly, from about 20 percent to about 40 percent by volume of another liquid hydrocarbon.

10. The method of claim 9 wherein the aromatic hydrocarbon is benzene and the other liquid hydrocarbon is mineral oil.

11. A method for preparing a filter medium for use in a water scrubbing system removing radon daughter contamination from air which comprises:
   a. drying a water-insoluble granular substrate at a temperature of at least about 150°F;
   b. contacting the dried substrate with an excess of a normally liquid hydrocarbon before the substrate with an excess is cooled to wet the substrate surface with the hydrocarbon; and
   c. removing the excess liquid hydrocarbon to recover the oil-wetted substrate as the filter medium.

12. The method of claim 11 wherein the drying of the substrate takes place under vacuum.

13. The method of claim 11 wherein the filter medium consists of a supplementary substrate consisting of oil-wettable plastic particles and a primary oil-wetted substrate consisting of a granular inorganic material wherein the primary substrate is placed on top of the secondary substrate.

14. The method of claim 13 wherein the supplementary substrate are cellulose acetate beads and the second substrate is granular sand.

15. The method of claim 11 wherein the normally liquid hydrocarbon is benzene, toluene, hexane, kerosene, mineral oil, or mixtures thereof.

16. The method of claim 15 wherein the normally liquid hydrocarbon is a mixture of benzene and mineral oil.

17. A filter adapted for use in a process for the removal of radon daughter contamination from air, which system include wash water contaminated with said radon daughters, the filter which comprises:

a. a body to contain a filter medium, the body having a water inlet and water outlet opening;

b. a filter medium comprising a granular substrate, the surface of the substrate having been oil-wetted with a normally liquid hydrocarbon.

18. The filter of claim 17 wherein the granular substrate is a primary filter medium and the filter medium includes as a supplementary filter, oil-wettable plastic beads surface wetted with the normally liquid hydrocarbon.

19. The filter of claim 18 wherein the granular substrate is sand and the supplementary substrate consists of cellulose acetate pellets.

20. The filter of claim 19 whrein the normally liquid hydrocarbon is an aromatic hydrocarbon.

21. The filter of claim 20 wherein the aromatic hydrocarbon includes from about 20 percent to about 40 percent by volume of another normally liquid hydrocarbon.

22. The filter of claim 21 wherein the aromatic hydrocarbon is benzene and the other hydrocarbon is mineral oil.

23. The filter of claim 17 wherein the normally liquid hydrocarbon is an aromatic hydrocarbon.

24. The filter of claim 23 wherein the aromatic hydrocarbon contains from about 20 percent to about 40 percent by volume of another normally liquid hydrocarbon.

25. The filter of claim 24 wherein the aromatic hydrocarbon is benzene and the other hydrocarbon is mineral oil.

* * * * *